(12) United States Patent
Nair et al.

(10) Patent No.: US 11,657,252 B2
(45) Date of Patent: May 23, 2023

(54) POINT TO POINT CONNECTED PROCESSING ELEMENTS WITH DATA JOINER COMPONENTS

(71) Applicant: Meta Platforms, Inc., Menlo Park, CA (US)

(72) Inventors: Krishnakumar Nair, Newark, CA (US); Dheevatsa Mudigere, Fremont, CA (US); Abdulkadir Utku Diril, Menlo Park, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1020 days.

(21) Appl. No.: 16/434,960

(22) Filed: Jun. 7, 2019

(65) Prior Publication Data

US 2020/0387771 A1 Dec. 10, 2020

(51) Int. Cl.
*G06N 3/02* (2006.01)
*G06F 9/38* (2018.01)
*G06F 13/42* (2006.01)
*G06F 17/16* (2006.01)

(52) U.S. Cl.
CPC ............. *G06N 3/02* (2013.01); *G06F 9/3895* (2013.01); *G06F 13/42* (2013.01); *G06F 17/16* (2013.01)

(58) Field of Classification Search
CPC ......... G06N 3/02; G06F 9/3895; G06F 13/42; G06F 17/16; G06F 9/5066; H04L 67/10
See application file for complete search history.

(56) References Cited

U.S. PATENT DOCUMENTS

| | | | | |
|---|---|---|---|---|
| 11,366,875 | B2* | 6/2022 | Chen | G06N 3/082 |
| 2016/0342893 | A1 | 11/2016 | Ross | |
| 2018/0349319 | A1* | 12/2018 | Kamilov | G06F 17/16 |
| 2019/0026250 | A1 | 1/2019 | Das Sarma | |
| 2019/0042257 | A1 | 2/2019 | Baum | |
| 2019/0325303 | A1* | 10/2019 | Daga | G06N 3/063 |
| 2020/0104669 | A1* | 4/2020 | Chole | G06N 3/084 |
| 2021/0034846 | A1* | 2/2021 | Ko | G06V 40/28 |

OTHER PUBLICATIONS

International Search Report and Written Opinion for International Application No. PCT/IB2020/055429, dated Sep. 11, 2020, 11 Pages.

* cited by examiner

*Primary Examiner* — Dac V Ha
(74) *Attorney, Agent, or Firm* — Van Pelt, Yi & James LLP (57) ABSTRACT

A microprocessor system comprises a first processing element, a second processing element, a point-to-point connection between the first processing element and the second processing element, and a communication bus connecting together at least the first processing element and the second processing element. The first processing element includes a first matrix computing unit and the second processing element includes a second matrix computing unit. The point-to-point connection is configured to provide at least a result of the first processing element to a data joiner component of the second processing element configured to join at least the provided result of the first processing element with a result of the second matrix computing unit.

20 Claims, 6 Drawing Sheets

# POINT TO POINT CONNECTED PROCESSING ELEMENTS WITH DATA JOINER COMPONENTS

BACKGROUND OF THE INVENTION

A whole class of complex artificial intelligence problems can be solved using neural networks. Since these problems are often computationally and data intensive, hardware solutions are often beneficial for improving the performance of neural networks. The solutions can often be more quickly solved using hardware-based solutions and dividing a larger complex problem into smaller sub-problems. Each sub-problem can be solved individually and the result of each sub-problem can be merged to determine a solution to the larger problem. Moreover, each sub-problem can be distributed to a different problem-solving unit. However, depending on the type of problem, the merging of each sub-problem result may not be compatible with the hardware accelerator architecture. Since different problem types exist, it is a challenge to create a hardware platform compatible with different problem types without significantly sacrificing performance and efficiency. Therefore, there exists a need for a hardware solution that improves on the ability to solve different types of heavily distributed artificial intelligence problems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A distributed hardware accelerator system for solving complex artificial intelligence problems is disclosed. In various embodiments, the system includes a hardware accelerator architecture with multiple processing elements. Each processing element is capable of performing neural network operations such as matrix computations. Using a point-to-point network, the compute result of one processing element can be provided to another processing element where the compute results can be joined. In some embodiments, the point-to-point network allows for realigning of data between neural network layers. Rather than write the result of one processing element to memory and then reading the result from memory to merge the result with a second processing element result, the processing element results are realigned more efficiently. The number of memory writes is reduced providing for improved power efficiency. In some embodiments, the joining of processing element compute results involves realigning or shifting partial results into different address locations such as different byte lanes. Utilizing the disclosed system, the compute performance for solving artificial intelligence problems is significantly increased while simultaneously utilizing substantially less power. In various embodiments, the system is a low power system and substantially reduces the number of memory writes needed to solve neural network related problems.

In some embodiments, a microprocessor system comprises a first processing element including a first matrix computing unit, a second processing element including a second matrix computing unit, a point-to-point connection between the first processing element and the second processing element, and a communication bus connecting together at least the first processing element and the second processing element. For example, a hardware accelerator microprocessor system includes multiple processing elements that each include a matrix compute core for computing matrix operations such as matrix multiplications. The matrix compute engines can operate on input matrices to determine an output matrix result. In some embodiments, the matrix operation and arguments are provided via a communication bus. The different processing elements, such as the first and second processing elements, are connected via point-to-point connections. In some embodiments, the point-to-point connection is configured to provide at least a result of the first matrix computing unit to a data joiner component of the second processing element configured to join at least the provided result of the first matrix computing unit with a result of the second matrix computing unit. For example, a data joiner component of a processing element receives the matrix computation result of a corresponding upstream processing element via a point-to-point connection to the upstream processing element. The data joiner component can merge the result from the upstream processing element with the result of the current processing element. Matrix compute results may be joined by realigning the results, for example, by shifting one or more results to different address locations and/or byte lanes. For example, a compute engine result smaller than a cache line can be merged with other compute results to create a cache line block that is more efficiently written to memory. In various embodiments, the point-to-point connection and the data joiner component join the compute result of the first processing element with the compute result of a second processing element. In some embodiments, multiple processing elements are daisy-chained using point-to-point connections. For example, four 8-byte matrix operation results can be aligned into a single 32-byte data line using the point-to-point connections of four daisy-chained processing elements and corresponding data joiner components of the last three processing elements in the chain. Only a single memory write is needed by the last processing element to write the joined 32-byte data line to memory.

Figure 1:
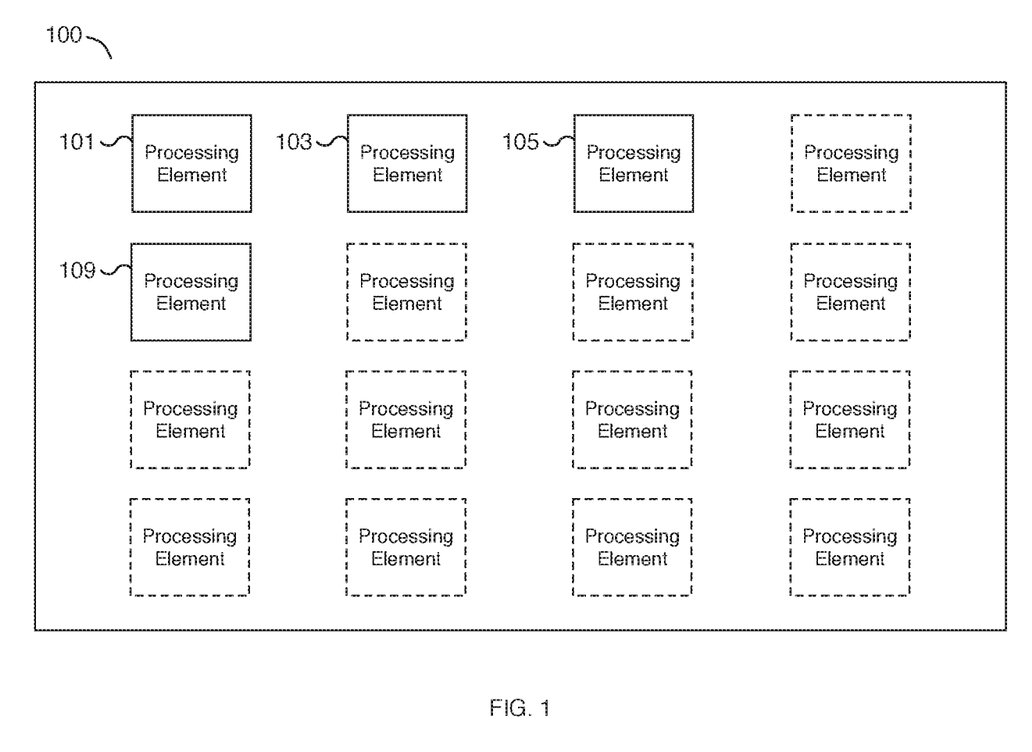
FIG. 1 is a block diagram illustrating an embodiment of a system for solving artificial intelligence problems using a neural network.

FIG. 1 is a block diagram illustrating an embodiment of a system for solving artificial intelligence problems using a neural network. For example, system 100 may be applied to use a neural network to solve problems such as image recognition and recommendation system matches. The matrix computational operations corresponding to the different layers of the neural network can be solved by distributing computational workload to the different processing elements of system 100. In the example shown, system 100 includes multiple processing elements such as processing elements 101, 103, 105, and 109. Additional processing elements are displayed in dotted boxes. Each processing element may be utilized by system 100 to perform matrix compute operations such as matrix multiplications. In various embodiments, the system 100 may include fewer or more processing elements. For example, the number of processing elements can be scaled up or down depending on the intended computational and data requirements. In some embodiments, system 100 is communicatively connected to a memory unit (not shown). For example, the memory unit may be a last level cache (LLC) and/or may be implemented using static random-access memory (SRAM).

In some embodiments, the processing elements of system 100, including processing elements 101, 103, 105, and 109, are connected to a communication bus (not shown). The communication bus may be used to transmit processing element instructions and optional instruction arguments. For example, a matrix operation and matrix operands may be transmitted to a processing element, such as processing element 101, via the communication bus. In various embodiments, a large, complex artificial intelligence problem can be solved using system 100 by subdividing the problem into smaller sub-problems. The smaller sub-problems can be assigned and distributed to different processing elements. The results of the smaller sub-problems can be merged to determine the solution to the larger and more complex problem. In some scenarios, the sub-problems are solved in parallel and/or in pipelined stages. In some scenarios, the result from a first processing element is fed as an input to a second processing element.

In various embodiments, the processing elements of system 100, such as processing elements 101, 103, 105, and 109, each may include a data joiner unit (not shown) and a point-to-point connection (not shown) with another processing element. For example, a point-to-point connection provides the compute result of one processing element to the data joiner unit of a downstream processing element. The data joiner unit receives both the result of its processing element and the upstream result and merges the two results together. The merged result can be provided to a subsequent downstream processing element via a separate point-to-point connection with the subsequent downstream processing element. In some embodiments, multiple processing elements are daisy-chained together via multiple point-to-point connections to merge the results of multiple processing elements.

Figure 2:
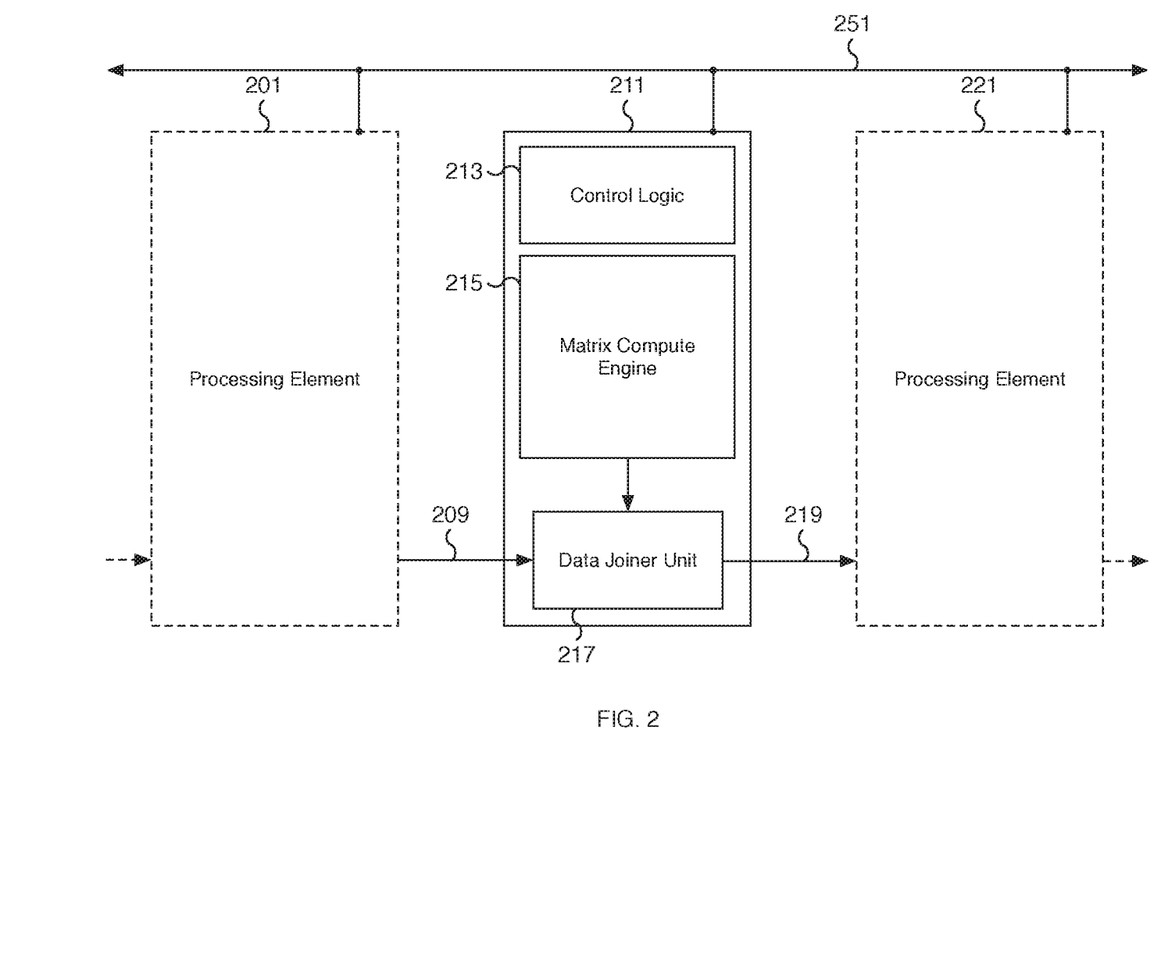
FIG. 2 is a block diagram illustrating an embodiment of a processing element for solving artificial intelligence problems using a neural network.

FIG. 2 is a block diagram illustrating an embodiment of a processing element for solving artificial intelligence problems using a neural network. In the example shown, processing element 211 includes control logic 213, matrix compute engine 215, and data joiner unit 217. Processing element 211 is connected to processing element 201 via point-to-point connection 209 and to processing element 221 via point-to-point connection 219. Processing element 211 is also connected to communication bus 251. Processing elements 201 and 221 are shown as dotted boxes and some details of processing elements 201 and 221 are not shown. Dotted arrows leading to processing element 201 and from processing element 221 are optional point-to-point connections from additional (optional) processing elements (not shown). Similar to processing element 211, processing elements 201 and 221 are connected to communication bus 251. In some embodiments, processing element 211 is one of processing elements 101, 103, 105, and/or 109 of FIG. 1 and point-to-point connection 209 and/or 219 is a point-to-point connection connecting to another processing element of FIG. 1.

In some embodiments, control logic 213 of processing element 211 is used to control the operation of processing element 211 including the operation of matrix compute engine 215 and data joiner unit 217. For example, control logic 213 may be used to determine how to align data received at data jointer unit 217, including what byte lane to assign different data arguments. In some embodiments, control logic 213 is used to process instructions received by processing element 211 via communication bus 251. For example, a processing element instruction may include matrix compute instructions, matrix arguments, byte alignment commands, etc.

In some embodiments, matrix compute engine 215 is a hardware matrix compute engine for performing matrix operations including operations related to matrix multiplication and/or convolution operations. For example, matrix compute engine 215 may be a matrix engine for performing dot product operations. In some embodiments, the convolution operations supported include depthwise, groupwise, normal, regular, pointwise, two-dimensional, and/or three-dimensional convolutions, among others. For example, matrix compute engine 215 may receive a first input matrix such as a subset of a large image and a second input matrix such as a filter, kernel, or convolution matrix, etc. to apply to the first input matrix. Matrix compute engine 215 can be used to perform a convolution operation using the two input matrices to determine a resulting output matrix. In some embodiments, matrix compute engine 215 may include input and/or output buffers for loading input data matrices and writing out a result data matrix. In the example shown, matrix compute engine 215 provides the output result to data joiner unit 217.

In some embodiments, data joiner unit 217 is a hardware unit for joining two data inputs. In the example shown, data joiner unit 217 receives a first input operand from matrix compute engine 215 and a second input operand from processing element 201 via point-to-point connection 209. In various embodiments, the first input operand from matrix compute engine 215 is a matrix operation result and the second input operand is a processing result from processing element 201. In some embodiments, the processing result from processing element 201 may be the result of a matrix computation performed by processing element 201 and/or the result from merging the matrix compute result of processing element 201 using a corresponding data joiner unit (not shown) of processing element 201. Once the two input operands are received by data joiner unit 217, data joiner unit 217 provides the joined result to processing element 221 via point-to-point connection 219. In various embodiments, data joiner unit 217 merges two inputs into a single output. The output can then be provided to a downstream processing element via a point-to-point connection. One or both inputs may be shifted so that each input is preserved but aligned differently. For example, data joiner unit 217 may shift one input to concatenate the two inputs together. As an example, two 8-byte inputs can be merged into a 16-byte output result. Similarly, two 16-byte inputs can be merged into a 32-byte output result. In various embodiments, different input data sizes (e.g., 4-byte, 8-byte, 16-byte, etc.) and alignment options may be appropriate depending on the compute context.

In some embodiments, point-to-point connections 209 and 219 are network connections from processing element 201 and to processing element 221, respectively, for processing element 211. Point-to-point connection 209 is used to provide a matrix compute result and/or the result of a data joiner unit (not shown) of processing element 201 to data joiner unit 217 of processing element 211. Point-to-point connection 219 is used to provide the result of data joiner unit 217 of processing element 211 to a data joiner unit (not shown) of processing element 221. In various embodiments, processing elements can include a connection to an upstream processing element, such as point-to-point connection 209 for processing element 211, and/or a connection to a downstream processing element, such as point-to-point connection 219 for processing element 211. By utilizing a point-to-point connection, the matrix compute result does not need to be transmitted over communication bus 251. Bus protocols and other related overhead for bus communication are avoided.

Figure 3:
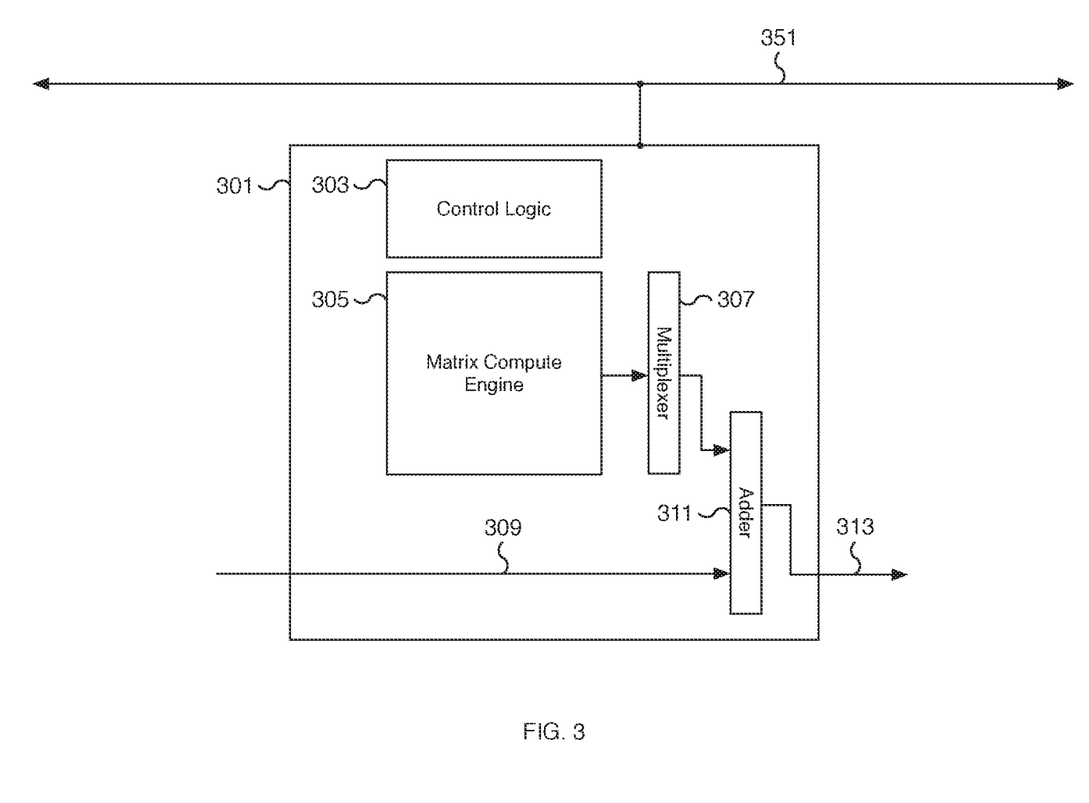
FIG. 3 is a block diagram illustrating an embodiment of a processing element for solving artificial intelligence problems using a neural network.

FIG. 3 is a block diagram illustrating an embodiment of a processing element for solving artificial intelligence problems using a neural network. In the example shown, processing element 301 includes control logic 303, matrix compute engine 305, multiplexer 307, adder 311, point-to-point connection 309, and point-to-point connection 313. Processing element 301 is connected to communication bus 351, an upstream processing element (not shown) via point-to-point connection 309, and a downstream processing element (not shown) via point-to-point connection 313. In some embodiments, processing element 301 is processing element 211 of FIG. 2 and control logic 303, matrix compute engine 305, point-to-point connection 309, point-to-point connection 313, and communication bus 351 are control logic 213, matrix compute engine 215, point-to-point connection 209, point-to-point connection 219, and communication bus 251, respectively, of FIG. 2. In some embodiments, multiplexer 307 and adder 311 are included as part of data joiner unit 217 of FIG. 2.

In various embodiments, control logic 303 and matrix compute engine 305 function as described with respect to control logic 213 and matrix compute engine 215 of FIG. 2. For example, control logic 303 processes processing element instructions including matrix computation instructions received via communication bus 351. Similarly, matrix compute engine 305 receives matrix operations and performs matrix computation operations such as convolution and/or matrix multiplication operations. In the example shown, the output of matrix compute engine 305 is provided to multiplexer 307.

In some embodiments, multiplexer 307 is utilized to realign the output of matrix compute engine 305. For example, an 8-byte compute result can be shifted 8-bytes and stored as a 32-byte padded value. In various embodiments, the realigned output is padded with zeros so that the realigned output can be merged with additional 8-byte results. For example, using a 32-byte value, four 8-byte compute engine results can be merged together using a series of four disclosed processing elements. In various embodiments, multiplexer 307 is used to shift the input to multiplexer 307 by a configured number of bits. The number of bits may be byte aligned and/or a multiple of 8-bits (e.g., 8-bytes, 16-bytes, 24-bytes, etc.). For example, a 16-byte matrix compute result can be shifted 16 bytes. In some embodiments, the number of bits a matrix compute engine result is shifted is specified by a processing element instruction. The number of bits specified can be 0-bits resulting in the input passing through multiplexer 307 unchanged. In some embodiments, multiplexer 307 is sized to match the output size of matrix compute engine 305. For example, a matrix compute engine that computes a 32-byte result is configured with a multiplexer that can receive a 32-byte input. In various embodiments, the input size and output size of multiplexer 307 are the same. For example, a multiplexer that receives a 32-byte matrix compute result outputs a realigned 32-byte output. In some embodiments, multiplexer 307 is implemented using another appropriate hardware unit for realigning data. The realigned matrix compute result is provided to adder 311.

In some embodiments, adder 311 receives the realigned matrix compute from multiplexer 307 along with a second input via point-to-point connection 309. The second input may be the processing result of an upstream processing element. For example, the processing result can be a matrix compute result or multiple merged compute results. Adder 311 merges the two received inputs into a single output result. For example, a zero-padded multiplexer result is added to the input provided via point-to-point connection 309. The result is then provided to a downstream processing element (not shown) via point-to-point connection 313. In various embodiments, point-to-point connections between processing elements, such as point-to-point connections 309 and/or 313, are used to merge compute engine results without needing to first write a compute result to memory, avoiding a potentially expensive memory operation.

Figure 4:
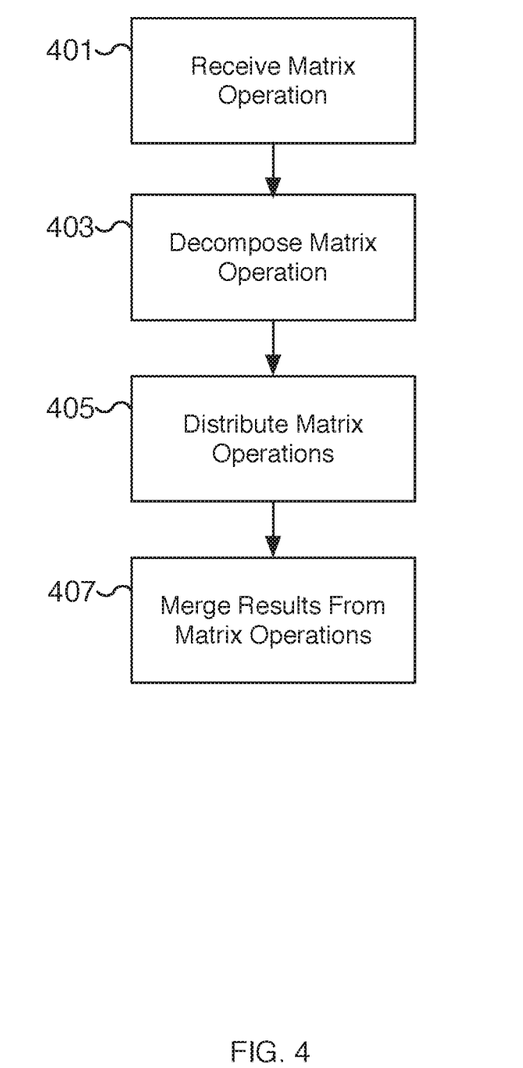
FIG. 4 is a flow chart illustrating an embodiment of a process for solving matrix operations involving large data sets using a hardware accelerator.

FIG. 4 is a flow chart illustrating an embodiment of a process for solving matrix operations involving large data sets using a distributed hardware accelerator system. For example, a multi-layer neural network is used to solve a complex artificial intelligence problem by first solving a matrix operation involving large data sets. The large data sets may be image data, recommendation data, or another appropriate input data set. In various embodiments, a distributed hardware accelerator system includes multiple processing elements and the matrix operations to be solved require matrix operands that are larger than any individual processing element can process. The matrix operation is decomposed into smaller sub-problems that can be solved by one or more processing elements. In some embodiments, the process of FIG. 4 is applied using a hardware accelerator system such as system 100 of FIG. 1.

At 401, a matrix operation is received. The matrix operation includes matrix operands such as one or more input matrices. In various embodiments, the matrix operation includes matrix operands that are too large for an individual processing element to process. For example, each processing element may be configured with a matrix compute engine that can compute the product of two 32×32 matrices. A matrix operation may include matrix operands that are larger than a 32×32 matrix, such as a 1024×1024 matrix. In order to perform the matrix operation received, the problem can be decomposed into multiple smaller problems.

At 403, the matrix operation is decomposed. For example, the matrix operation received at 401 is decomposed into smaller sub-problems. Each sub-problem utilizes matrix operations that a single processing element can process. For example, a processing element configured with a matrix compute engine that can compute the product of two 32×32 matrices is provided with matrices that are 32×32 or smaller. In various embodiments, the output of one sub-problem may be the input of another sub-problem. In some embodiments, the sub-problems can be solved in parallel and/or in pipelined stages.

At 405, matrix operations are distributed. For example, each of the sub-problems of the decomposed matrix operation of 403 is distributed to a processing element. In various embodiments, multiple processing elements of the hardware accelerator system each receive a sub-problem to solve. The received sub-problem may utilize a subset of the original matrix arguments such as a slice of one of the input matrices. In some embodiments, the matrix arguments are the result of a previously solved sub-problem, for example, a result determined by one of the processing elements. The distributed matrix operations may be solved in parallel by the assigned processing elements.

At 407, results from matrix operations are merged. For example, the results of each sub-problem are merged to determine a final result for the matrix operation received at 401. In some embodiments, the results are merged in part by daisy-chaining processing elements and utilizing point-to-point connections between processing elements as described herein. The merged results may be written more efficiently to avoid unnecessary memory writes, which results in significant performance improvements. In various embodiments, results of sub-problems solved using distributed processing elements of the hardware accelerator system are merged to determine the final result of the matrix operation received at 401.

Figure 5:
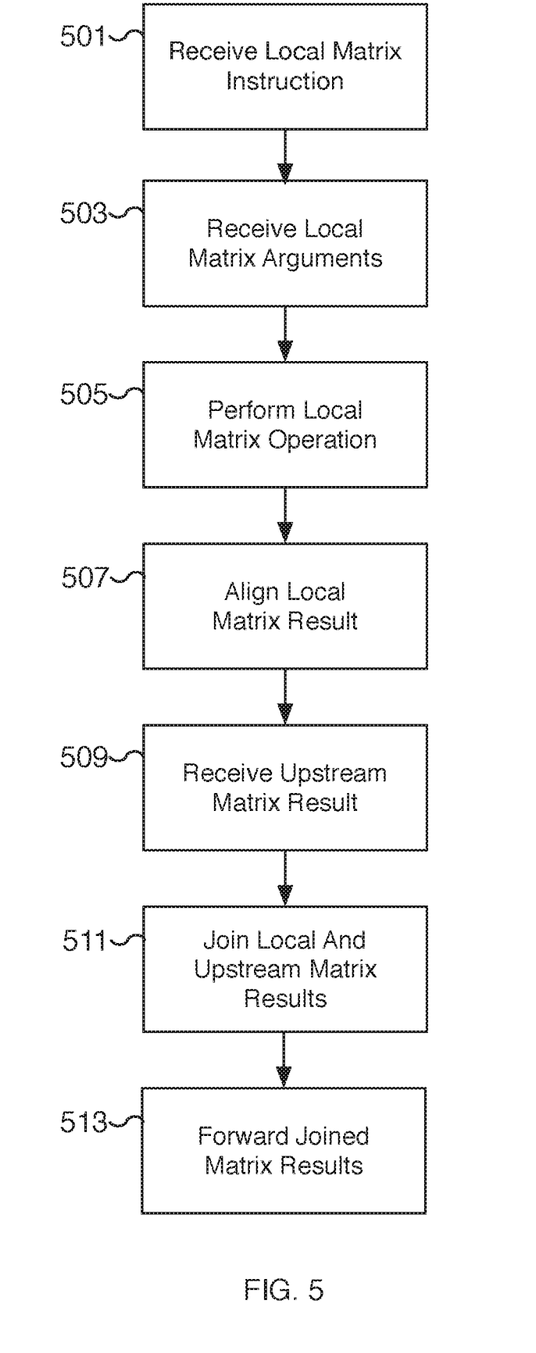
FIG. 5 is a flow chart illustrating an embodiment of a process for solving matrix operations involving large data sets using a distributed hardware accelerator system.

FIG. 5 is a flow chart illustrating an embodiment of a process for solving matrix operations involving large data sets using a distributed hardware accelerator system. For example, a processing element of a distributed hardware accelerator system is utilized to solve a sub-problem of a larger, more complex matrix problem. In some embodiments, the processing element is used in part to solve a complex artificial intelligence using a multi-layer neural network. In some embodiments, the process of FIG. 5 is performed at 405 and/or 407 of FIG. 4 to improve the performance and power efficiency of matrix computations.

At 501, a local matrix instruction is received. For example, a matrix compute instruction is received at a processing element for the processing element to perform a matrix operation. In various embodiments, the matrix instruction includes a matrix operation and matrix arguments such as two input matrices. In some embodiments, the matrix instruction is used to solve a convolution operation.

At 503, local matrix arguments are received. For example, the data corresponding to matrix arguments such as the input matrices for a matrix compute engine is received. In some embodiments, the data is received as a result of a reading from a location, such as a memory address or register, described by the matrix instruction received at 501. For example, the data corresponding to two input matrices, such as a data matrix and a weight matrix, is received. In some embodiments, the data is received via a communication bus.

At 505, a local matrix operation is performed. For example, using a matrix compute engine, a local matrix operation is performed by the processing element. The matrix operation may be a convolution operation using the data corresponding to arguments received at 503. In some embodiments, the matrix operation is a matrix multiplication operation. The result of the matrix operation is a matrix result determined using the matrix compute engine of the processing element.

At 507, the local matrix result is aligned. For example, the local matrix result computed using the matrix compute engine is aligned. In various embodiments, the result is aligned to a location offset such as shifting the result by a configured number of bits. For example, an 8-byte matrix result may be shifted 8-bytes, 16-bytes, or 24-bytes and padded with zeros to fill out a 32-byte value. Depending on the upstream matrix result that will be joined with the local matrix result at 511, the local matrix result may be aligned using a particular format such as a specific byte lane. In some embodiments, the alignment is specified by the local matrix instruction received at 501.

At 509, an upstream matrix result is received. For example, the processing result of an upstream processing element is received via a point-to-point connection. The processing result may be a matrix result determined using a matrix compute engine of the upstream processing element. In some embodiments, the processing result is a result of a data joiner unit that merges results from multiple processing elements.

At 511, local and upstream matrix results are joined. For example, the local matrix result aligned at 507 is joined with the upstream matrix result received at 509. In various embodiments, the joined result packs multiple matrix compute results together. For example, an 8-byte matrix compute result aligned at 507 can be packed together with an 8-byte, 16-byte, or 24-byte upstream matrix result into a 32-byte value. The joined results may be packed into a memory write unit, such as a memory block or cache-line.

At 513, the joined matrix results are forwarded. In some embodiments, the joined results are forwarded via a point-to-point connection to a downstream processing element. The downstream processing element may further join a matrix compute result computed by the matrix compute engine of the downstream processing element to efficiently pack an additional matrix compute result. By forwarding the joined matrix results directly to the downstream processing element, the number of memory writes required is reduced resulting in improved performance and reduced power requirements.

Figure 6:
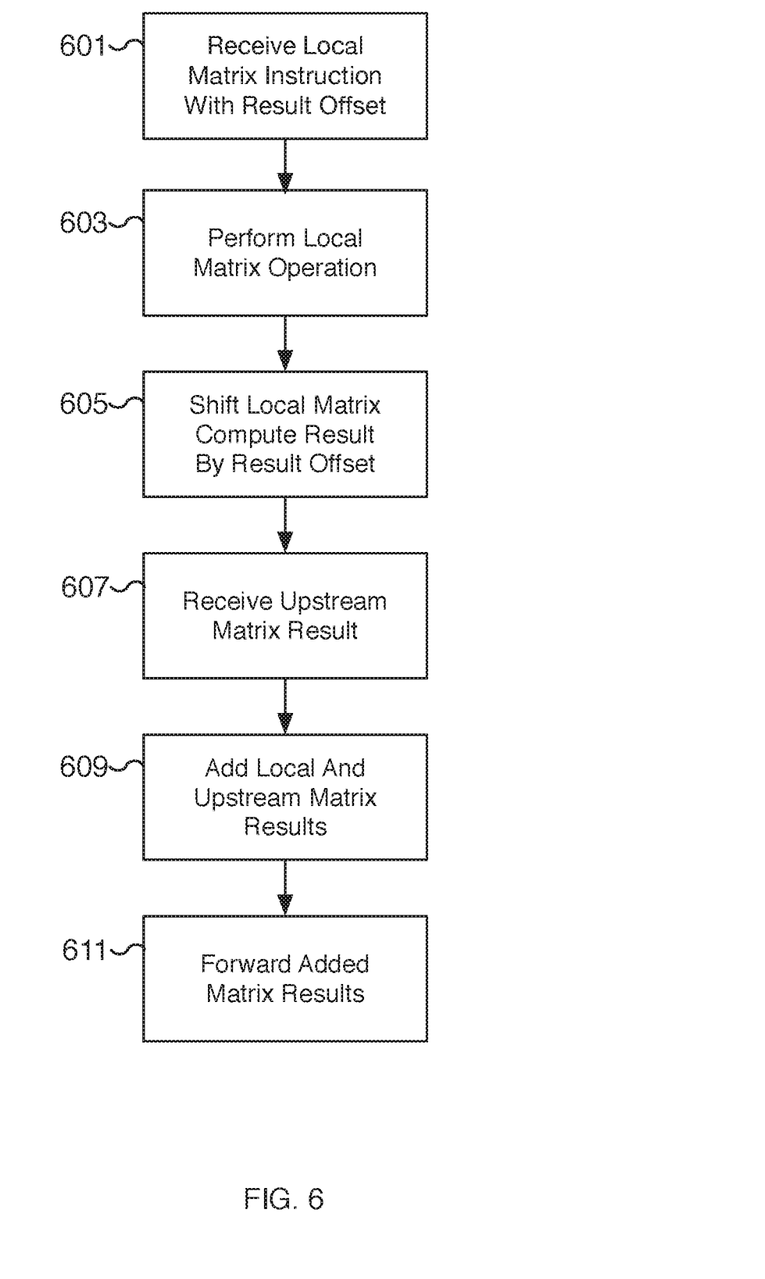
FIG. 6 is a flow chart illustrating an embodiment of a process for solving matrix operations involving large data sets using a distributed hardware accelerator system.

FIG. 6 is a flow chart illustrating an embodiment of a process for solving matrix operations involving large data sets using a distributed hardware accelerator system. For example, a processing element of a distributed hardware accelerator system is utilized to solve a sub-problem of a larger, more complex matrix problem. In some embodiments, the processing element is used in part to solve a complex artificial intelligence using a multi-layer neural network. In some embodiments, the process of FIG. 6 is performed at 405 and/or 407 of FIG. 4 to improve the performance and power efficiency of matrix computations. In some embodiments, the process of FIG. 6 is performed using the processing element of FIG. 3. In some embodiments, the process of FIG. 6 is a more specialized version of the process of FIG. 5.

At 601, a local matrix instruction with a result offset is received. For example, a matrix compute instruction is received at a processing element for the processing element to perform a matrix operation. The local matrix instruction includes a result offset used to specify that the matrix compute result should be shifted. For example, the result offset can specify the number of bits (e.g., 8-bits, 16-bits, 24-bits, etc.) to shift the result. The matrix instruction may also specify whether to merge the result with results from an upstream processing element. In some embodiments, the step of 601 is performed at 501 of FIG. 5.

At 603, a local matrix operation is performed. For example, using a matrix compute engine, a local matrix operation is performed by the processing element. The matrix operation may be a convolution operation corresponding to the instruction received at 601. The data corresponding to the arguments for the local matrix operation is received as a result of a reading from a location, such as a memory address or register, described by the matrix instruction received at 601. For example, the data corresponding to two input matrices, such as a data matrix and a weight matrix, is received to perform the local matrix operation. The result of a local matrix operation is a local matrix compute result. In some embodiments, the step of 603 is performed at 503 and/or 505 of FIG. 5.

At 605, the local matrix compute result is shifted by a result offset. Using the result offset specified at 601, the local matrix compute result is shifted to align the result to a particular offset. In various embodiments, the result is aligned to a location offset such as shifting the result by a result offset amount. For example, an 8-byte matrix result may be shifted 8-bytes, 16-bytes, or 24-bytes and padded with zeros to fill out a 32-byte value. In some embodiments, the step of 605 is performed at 507 of FIG. 5.

At 607, an upstream matrix result is received. For example, the processing result of an upstream processing element is received via a point-to-point connection. The processing result may be a matrix result determined using a matrix compute engine of the upstream processing element. In some embodiments, the processing result is a result of a data joiner unit that merges results from multiple processing elements. In some embodiments, the step of 607 is performed at 509 of FIG. 5.

At 609, the local and upstream matrix results are added. For example, the local matrix result shifted at 605 is joined with the upstream matrix result received at 607 by adding the two results together. In various embodiments, the joined result packs multiple matrix compute results together. For example, an 8-byte matrix compute result shifted at 605 can be packed together with an 8-byte, 16-byte, or 24-byte upstream matrix result into a 32-byte value. The joined results may be packed into a memory write unit, such as a memory block or cache-line. In some embodiments, the step of 609 is performed at 511 of FIG. 5.

At 611, the added matrix results are forwarded. In some embodiments, the joined results are forwarded via a point-to-point connection to a downstream processing element. The downstream processing element may further join a matrix compute result computed by the matrix compute engine of the downstream processing element to efficiently pack an additional matrix compute result. By forwarding the joined matrix results directly to the downstream processing element, the number of memory writes required is reduced resulting in improved performance and reduced power requirements. In some embodiments, the step of 611 is performed at 513 of FIG. 5.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A microprocessor system, comprising:
   a first processing element including a first matrix computing unit;
   a second processing element including a second matrix computing unit;
   a point-to-point connection between the first processing element and the second processing element, wherein the point-to-point connection is configured to provide at least a result of the first processing element to a data joiner component of the second processing element configured to join at least the provided result of the first processing element with a result of the second matrix computing unit, wherein the data joiner component includes an adder and a multiplexer and the multiplexer is configured to receive the result of the second matrix computing unit; and
   a communication bus connecting together at least the first processing element and the second processing element.

2. The system of claim 1, wherein the multiplexer is configured to shift the result of the second matrix computing unit by a configured result offset.

3. The system of claim 2, wherein the configured result offset is a 0-byte, 8-byte, 16-byte, or 24-byte offset.

4. The system of claim 2, wherein the configured result offset is specified by a processing element instruction.

5. The system of claim 4, wherein the processing element instruction is a convolution operation instruction.

6. The system of claim 4, wherein the second processing element is configured to receive the processing element instruction via the communication bus.

7. The system of claim 2, wherein the adder is configured to receive the result of the first processing element and the shifted result of the second matrix computing unit.

8. The system of claim 7, wherein the adder is configured to add together the result of the first processing element and the shifted result of the second matrix computing unit to output a packed result.

9. The system of claim 8, wherein the packed result is a size of a cache-line.

10. The system of claim 8, further comprising a second point-to-point connection configured to send the packed result to a third processing element, and wherein the second point-to-point connection connects the second matrix computing unit to the third processing element.

11. The system of claim 10, wherein the third processing element includes a second data joiner component and the second data joiner component is connected to the second point-to-point connection.

12. The system of claim 8, wherein the packed result includes a plurality of matrix compute results, and each matrix compute result of the plurality of matrix compute results is determined using a different processing element.

13. The system of claim 1, wherein the microprocessor system is included in an integrated circuit chip.

14. A method, comprising:
determining a processing result using a first processing element, wherein the first processing element includes a first matrix computing unit;
providing the processing result of the first processing element to a data joiner component of a second matrix computing unit via a first point-to-point connection;
determining a result of the second matrix computing unit;
providing the result of the second matrix computing unit to the data joiner component of the second matrix computing unit, wherein the data joiner component includes an adder and a multiplexer and the multiplexer is configured to receive the result of the second matrix computing unit;
joining the processing result of the first processing element and the result of the second matrix computing unit to create a packed result; and
sending the packed result to a third processing element via a second point-to-point connection.

15. The method of claim 14, wherein the multiplexer is configured to shift the result of the second matrix computing unit by a configured result offset.

16. The method of claim 15, wherein the configured result offset is specified by a processing element instruction.

17. The method of claim 16, wherein the processing element instruction includes a convolution operation instruction.

18. The method of claim 14, wherein the processing result of the first matrix computing unit and the result of the second matrix computing unit are byte-aligned in the packed result.

19. The method of claim 14, wherein the packed result includes a plurality of matrix compute results, and each matrix compute result of the plurality of matrix compute results is determined using a different processing element.

20. A microprocessor system, comprising:
a first processing element including a first matrix computing unit and a first data joiner component;
a second processing element including a second matrix computing unit and a second data joiner component;
a third processing element including a third matrix computing unit and a third data joiner component;
a first point-to-point connection between the first data joiner component of the first processing element and the second data joiner component of the second processing element, wherein the first point-to-point connection is configured to provide at least a first output result of the first data joiner component to the second data joiner component, and wherein the second data joiner component is configured to output a second output result by combining at least the first output result with a matrix compute result of the second matrix computing unit;
a second point-to-point connection between the second data joiner component of the second processing element and the third data joiner component of the third processing element, wherein the second point-to-point connection is configured to provide at least the second output result of the second data joiner component to the third data joiner component; and
a communication bus connecting together at least the first processing element, the second processing element, and the third processing element.

* * * * *